United States Patent [19]

Nishimura et al.

[11] Patent Number: 5,380,179
[45] Date of Patent: Jan. 10, 1995

[54] BINDER SYSTEM FOR USE IN THE INJECTION MOLDING OF SINTERABLE POWDERS AND MOLDING COMPOUND CONTAINING THE BINDER SYSTEM

[75] Inventors: Kimihiro Nishimura, Chiba; Kenji Yoshino, Tokyo, both of Japan

[73] Assignee: Kawasaki Steel Corporation, Japan

[21] Appl. No.: 33,094

[22] Filed: Mar. 16, 1993

[30] Foreign Application Priority Data

Mar. 16, 1992 [JP] Japan .................................. 4-058088
Oct. 8, 1992 [JP] Japan .................................. 4-270097

[51] Int. Cl.⁶ .............................................. B22F 1/00
[52] U.S. Cl. .............................................. 419/36; 419/38; 419/65; 264/63; 264/344; 106/285; 106/287.23
[58] Field of Search ...................... 419/36, 65, 38; 264/344, 63; 106/285, 287.23

[56] References Cited

U.S. PATENT DOCUMENTS

| | | | |
|---|---|---|---|
| 4,000,110 | 12/1976 | Saito et al. | 260/42.11 |
| 4,526,921 | 7/1985 | Sakurai et al. | 524/405 |
| 4,704,242 | 11/1987 | Bandyopadhyay et al. | 264/234 |
| 4,708,838 | 11/1987 | Bandyopadhyay et al. | 264/63 |
| 4,906,424 | 4/1990 | Hughes et al. | 264/63 |
| 5,188,782 | 2/1993 | Bittler et al. | 264/82 |
| 5,198,489 | 3/1993 | Sterzel et al. | 524/439 |

FOREIGN PATENT DOCUMENTS

| | | |
|---|---|---|
| 0161854 | 11/1985 | European Pat. Off. |
| 0336733 | 11/1989 | European Pat. Off. |
| 59-182267 | 10/1984 | Japan |
| 1-257158 | 10/1989 | Japan |

*Primary Examiner*—Donald P. Walsh
*Assistant Examiner*—Anthony R. Chi
*Attorney, Agent, or Firm*—Austin R. Miller

[57] ABSTRACT

The improved binder system for use in the injection molding of sinterable powders such as metal powders, ceramic powders and cermet powders comprises a (co)polymer that has a molecular weight in excess of 2000 and which contains at least one epoxy group in the molecule. Preferably, the binder system comprises said (co)polymer, a (co)polymer other than said (co)polymer, and an organic compound having a molecular weight up to 2000. Using a binder system comprising (a) 3–80 wt % of a (co)polymer that has a molecular weight in excess of 2000 and which has at least one epoxy group in the molecule, (b) up to 70 wt % of a (co)polymer other than component (a), and (c) 20–80 wt % of an organic compound having a molecular weight of not more than 2000, there is provided a composition for the injection molding of sinterable powders. The compound has excellent moldability and strength properties. The powders to be mixed with the binder system for use in injection molding have preferably average particle sizes in the range of 0.01–1000 μm.

12 Claims, 1 Drawing Sheet

BINDER SYSTEM FOR USE IN THE INJECTION MOLDING OF SINTERABLE POWDERS AND MOLDING COMPOUND CONTAINING THE BINDER SYSTEM

BACKGROUND OF THE INVENTION

This invention relates to a binder system for use in the injection molding of metal powders, ceramic powders and cermet powders (these powders are hereunder collectively referred to as "sinterable powders"), as well as a molding compound containing the binder system.

Sinters are conventionally produced by a process that comprises mixing a sinterable powder with a binder, molding the mixture by a suitable technique such as casting, extrusion, jiggering or pressing, and sintering the molded part. However, it is difficult to produce sinters of complex forms by these molding methods. Under the circumstances, injection molding of sinterable powders is adopted as a method for producing more complexly molded parts.

Injection molding of sinterable powders is a technique commonly employed to mass produce small-sized sinters of complex shapes. The process starts with mixing a sinterable powder (raw material) with a binder to prepare a compound for injection molding. The compound is thermoplastic and can be molded into desired forms with an injection molding machine. This forming step is essentially the same as the molding of plastic materials and permits mass production. In the next step, the unwanted binder is removed from the molded part. This "debinding" step is performed either by heating the molded part so that the binder will evaporate or flow out or by holding the molded part in a solvent to extract the binder or by the combination of the two methods. A suitable debinding method is selected in accordance with the type of binder used. In the last step, the debound part is sintered to yield the final product.

Injection molding of sinterable powders is characterized by its ability to mold fine sinterable powders with which high sintered density can be attained. Fine powders having average particle sizes of no more than 10 $\mu$m have heretofore been difficult to mold by pressing for several reasons such as poor flowability and the galling of molds. In contrast, even such fine powders can be easily molded by the injection molding method and, furthermore, complex three-dimensional molds can be produced. Because of these advantages, the injection molding of sinterable powders has recently gained popularity in the manufacture of pure iron parts, Fe-Ni base alloyed parts and stainless steel parts and its application is making way even to magnetic materials and cemented carbides.

Binders to be used in the injection molding of sinterable powders are roughly classified into two types, thermoplastic and thermosetting, but considering the recycling of sprues, runners, etc. unrecyclable thermosetting binders are not used very often. Commonly used thermoplastic binder systems are composed of such ingredients as thermoplastic resins, waxes, plasticizers and lubricants. The resins, which are the principal ingredient of the binder system, impart plasticity to the molding compound and insure the necessary strength for the molded part at room temperature. Furthermore, waxes and plasticizers which are organics having lower molecular weights than the resins are added to improve the moldability and debinding properties. Known resin components include polyethylene, polypropylene, polystyrene, ethylene-vinyl acetate copolymer (EVA), ethylene-ethyl acrylate copolymer (EEA), poly (alkyl methacrylate) and polyamides, and these may be used either alone or in admixtures. Components of lower molecular weights than the resins include paraffin waxes, higher fatty acids, higher alcohols, higher fatty acid esters, higher fatty acid amides, and phthalic acid esters such as diethyl phthalate and dibutyl phthalate, and these may used either alone or in admixtures. Thus, compounds as the feed stock for the injection molding of sinterable powders are typically in the forms of a mixture of sinterable powders and several organic additives including resins, waxes and plasticizers.

Sinterable powders such as metal powders and ceramic powders have near-hydrophilic surfaces, so they wet very poorly with hydrophobic binders which are chiefly composed of organics. Hence, it is difficult to have the sinterable powders dispersed uniformly in the binders and agglomerates will readily form. If the molding compound contains agglomerates which are not wetted with the binder, the compound becomes highly viscous and not only does this impair the moldability of the compound but also the strength of the green body drops so markedly that cracking is prone to occur. As a further problem, cracking and blistering are also prone to occur during the removal of the binder (debinding step).

Agglomerates are more prone to form as the molecular weight of the binder increases. Consider, for example polyethylene (PE), polypropylene (PP) and polystyrene (PS); these resins have long been used in the binder systems for powder injection molding but because of their low ability to wet sinterable powders, the molding compound has such low fluidity that it is difficult to be injection molded or the molded part has only low strength.

It is known that the wettability of sinterable powders with binders can be enhanced either by treating the surface of sinterable powders to render it hydrophobic or by introducing into binder components those functional groups which will wet the hydrophilic surface of the sinterable powders. The first approach can be implemented by treating the surface of sinterable powders with a silane-base coupling agent, a titanate-base coupling agent [Japanese Patent Publication (kokoku) SHO No. 59-41949] or an aluminum chelate compound [Japanese Patent Laid-Open Publication (kokai) SHO No. 61-242947]. The second approach can be implemented by using surfactants [Japanese Patent Laid-Open Publication (kokai) SHO Nos. 59-182267 and 59-35058] or by using binder components into which a carboxyl group, an ester, an amino group, a hydroxyl group, an acid anhydride and other functional groups that will interact with the surface of sinterable powders have been introduced, as exemplified by an ethylene-vinyl acetate copolymer (EVA) [Japanese Patent Laid-Open Publication (kokai) SHO Nos. 52-117909 and 58-135173], an ethylene-ethyl acrylate copolymer (EEA) [Japanese Patent Laid-Open Publication (kokai) SHO No. 59-121150], cyclopentadiene-unsaturated dicarboxylic acid anhydride copolymers or hydrogenation products thereof [Japanese Patent Laid-Open Publication (kokai) No. 62-12658], alpha-methylstyrene-unsaturated acid anhydride copolymers [Japanese Patent Laid-Open Publication (kokai) SHO NO. 63-252951], stearic acid [Japanese Patent Publication (Kokoku) SHO No.

36-7883], behenic acid [Japanese Patent Laid-Open Publication (kokai) HEI No. 2-267156], and polyalkylene carbonates [Japanese Patent Laid-Open (kokai) Publication HEI No. 1-257158]. These methods are effective in improving the wettability of sinterable powders with binders and the powders are dispersed so uniformly in the binders that the molding compound can be easily injection molded to produce satisfactory molded parts.

While the selection of a suitable binder is important for successful injection molding of sinterable powders, the conventional binder systems have had the following problems.

Since binder resins such as polyethylene and polypropylene only poorly wet the sinterable powders, it is difficult to disperse the powders completely and the mixture contains residual agglomerates, thus failing to produce a uniform molding compound having good fluidity. Even if a low-molecular weight component such as wax is added with a view to improving moldability, the added component is still low in miscibility with the sinterable powder and troubles such as separation between the binder and the powder have occurred during injection molding. As a further problem, if heat is applied to remove the binder in the debinding step, the molded part may occasionally deform or debinding defects such as blisters or cracks may occur during heating. In order to avoid these "debinding defects", the debinding time has to be extended and it takes an increased time to complete the step of binder removal.

The ethylene-vinyl acetate copolymer (EVA) and ethylene-ethyl acrylate copolymer (EEA) have polar functional groups and are highly miscible with sinterable powders; hence, these resins are extensively used as components of injection molding binder systems. Compounds using these resins as binder components have good moldability and the molded part also has high strength. However, in order for these resins to exhibit their performance fully, the content of vinyl acetate or ethyl acrylate must exceed a certain level but, then, the softening temperature of the binder will drop. As a result, the molded part is highly prone to deform in the debinding step, with occasional occurrence of blisters. Therefore, a prolonged time is also required for binder removal to give an immaculate and sound debound part.

Polystyrene and poly (alkyl methacrylate) esters have high tendency to depolymerize and, hence, they are easy to remove and are often used as binder components. However, these resins wet sinterable powders so poorly thai they are no more suitable for molding than polyethylene and polypropylene.

Under the circumstances, it has been proposed that two or three of the resins described above be used in combination in the injection molding compound but the proposed combinations have their own advantages and disadvantages and, as of today, no single binder system has been developed that is satisfactory in terms of both moldability and ease of debinding.

The method of treating the surface of sinterable powders in order to improve their wettability with binders has various defects such as the high cost of agents used for surface treatment, the addition of an extra step for surface treatment, and the tendency of Ti, Si, and Al used as surface treating agents to remain in the sinter, thereby causing adverse effects on its properties. The addition of surfactants or higher aliphatic acids causes a drop in the softening temperature of the binder and, hence, defects such as deformation and blistering will readily take place upon application of heat for removing the binder. The proposal made by Japanese Patent Laid-Open Publication (kokai) SHO No. 62-12658 uses a polymer containing unsaturated bonds, so gelation is prone to occur during mixing and the molding compound becomes highly viscous or difficulty is encountered in the effort to recycle sprues or runners. The alpha-methylstyrene-unsaturated acid anhydride copolymer used in Japanese Patent Laid-Open Publication (kokai) SHO 63-252951 has such a high softening temperature and viscosity that it is also necessary to use large amounts of solvents such as toluene and alcohol and, as a result, not only does a significant change in density occur on account of the evaporation of solvent but there also occurs a marked drop in strength, thereby presenting difficulty in accomplishing injection molding. Furthermore, whichever method is used, prolonged application of heat is necessary in order no remove the binder without causing deformation and if the debinding time is shortened, blistering or deformation will inevitably occur.

SUMMARY OF THE INVENTION

In order to solve the aforementioned problems of the prior art, the present inventors conducted intensive studies on the components of a binder system and their proportions. As a result, it was found that when an epoxy group containing olefinic (co)polymer was used as an essential component of a binder system for use in the injection molding of sinterable powders, sufficiently good ability to wet the powders was achieved to provide satisfactory moldability and it was also found that the resulting compound could yield a molded part that did not experience extensive deformation or any other defects in the debinding step.

According to its first aspect, the present invention provides a binder system for use in the injection molding of sinterable powders that contains (a) 3–80 wt % of an olefinic (co)polymer with a molecular weight exceeding 2000 that has at least one epoxy group in the molecule and (c) 20–80 wt % of an organic compound with a molecular weight of not more than 2000.

According to its second aspect, the present invention provides a binder system for use in the injection molding of sinterable powders that contains (a) 3–80 wt % of an olefinic (co)polymer with a molecular weight exceeding 2000 that has at least one epoxy group in the molecule, (b) up to 70 wt % of a (co)polymer other than component (a) that has a molecular weight exceeding 2000, and (c) 20–80 wt % of an organic compound with a molecular weight of not more than 2000.

In a preferred embodiment, the present invention provides a binder system for use in the injection molding of sinterable powders in which component (b) is a homopolymer and/or a copolymer that are prepared by (co)polymerizing one or more monomers selected from among acrylate esters, methacrylate esters and styrene.

According to its third aspect, the present invention provides a compound for the injection molding of sinterable powders, in which either one of the binder systems described above is mixed with a sinterable powder having an average particle size of 0.01–1000 μm.

According to its forth aspect, the present invention provides a process for preparing a sintered material comprising the steps of; injection molding the compound of the third aspect of the present invention, debinding the molded compound, and sintering the debound body.

According to its fifth aspect, the present invention provides a sintered body being prepared by the process of the fourth aspect of the present invention.

BRIEF DESCRIPTION OF THE DRAWINGS

FIGS. 2A and 2B are diagrams showing a molded part, in which FIG. 2A is a diagram showing a molded part before it was subjected to debinding and FIG. 2B is a diagram showing how the amount of deformation occurring in the molded part during debinding is measured.

DETAILED DESCRIPTION OF THE PREFERRED EMBODIMENTS

Figure 1:
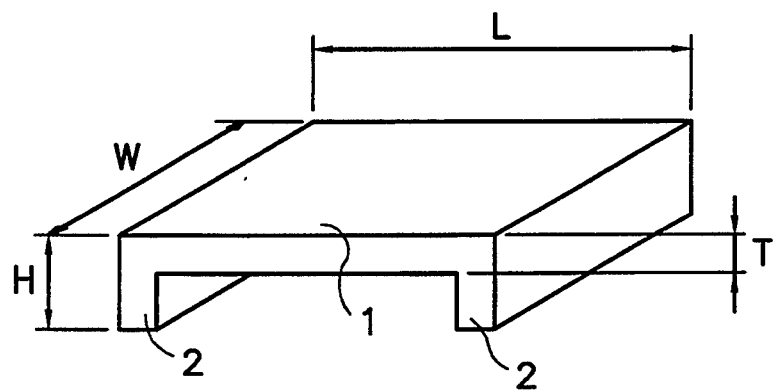
FIG. 1 is a diagram showing the dimensions of the test specimens prepared in Examples 1-17.

The present invention is described below in detail.

The binder system of the present invention is applicable to any sinterable powders and they include metal powders, ceramic powder and cermet powders. To name a few examples of metal powders, they include the powders of iron, copper, titanium, tungsten, nickel, molybdenum, chromium, zinc, aluminum, zirconium, beryllium germanium, cobalt, silicon, scandium, yttrium, lanthanides, actinides, hafnium, thorium, vanadium, tantalum, manganese, technetium, rhenium, ruthenium, rhodium, palladium, osmium, iridium, platinum, gold, silver, cadmium, thallium, tin, lead, arsenic, antimony, bismuth, tellurium and polonium, alloys thereof and mixtures thereof, such as stainless steel, iron-nickel base alloys, iron-silicon base alloys, iron-cobalt base alloys, iron-boron base alloys, and iron-cobalt-vanadium base alloys. Exemplary ceramic powders include the powders of aluminum oxide, silicon oxide, zirconium oxide, titanium oxide, beryllium oxide, magnesium oxide, niobium oxide, tantalum oxide, molybdenum oxide, manganese oxide, tungsten oxide, vanadium oxide, technetium oxide, rhenium oxide, cobalt oxide, nickel oxide, ruthenium oxide, rhodium oxide, cadmium oxide, thallium oxide, germanium oxide, tin oxide, lead oxide, antimony oxide, bismuth oxide, tellurium oxide, indium oxide, barium oxide, gallium oxide, yttrium oxide, calcium oxide, strontium oxide, lanthanum oxide, selenium oxide, scandium oxide, actinium oxide, thorium oxide, hafnium oxide, chromium oxide, palladium oxide, osmium oxide, zinc oxide, iron oxide, lead titanate, barium titanate, lead zirconate, strontium zirconate, lead titanate zirconate, magnesium titanate, manganese titanate, iron titanate, cobalt titanate, nickel titanate, silicon carbide, boron carbide, aluminum carbide, tungsten carbide, titanium carbide, zirconium carbide, hafnium carbide, molybdenum carbide, tantalum carbide, chromium carbide, vanadium carbide, silicon nitride, aluminum nitride, boron nitride, titanium nitride, titanium boride, zirconium boride, lanthanum boride, molybdenum disilicide, cadmium sulfide, zinc sulfide, and mixtures of two or more of these ceramics. Exemplary cermet powders include the powders of alloys of mixtures of the above-mentioned ceramics and metals. The sinterable powders may also be classified by method of preparation, such as carbonyl powders, water atomized powders, gas atomized powders and ground powders. If desired, two or more of these powders may be used in admixtures.

The sinterable powders that can be used have average particle sizes of 0.01–1000 μm, with the range of 0.1–1000 μm being preferred. A more preferred range of average particle size is from 0.1 to 50 μm. The particle size of the sinterable powder is advantageously as small as possible since its flowability during injection molding and its sintered density will increase with decreasing particle size. On the other hand, small particle sizes are disadvantageous from a practical viewpoint since a huge amount of energy is needed to produce fine particles. If the particle size exceeds 1000 μm, the flowability of the compound will decrease to such an extent that injection molding becomes substantially impossible.

Component (a) of the binder system of the present invention is an epoxy group containing olefinic (co)-polymer that is prepared by copolymerizing an epoxy group containing unsaturated monomer and/or at least one olefinic monomer that is copolymerizable with said unsaturated monomer; component (a) must have a melecular weight in excess of 2000. The epoxy group containing olefinic copolymer may be prepared by various modes of copolymerization, such as random copolymerization block copolymerization and graft copolymerization.

The epoxy group containing unsaturated monomer as a starting material for preparing component (a) is selected from among the following three classes of compound;

i) unsaturated glycidyl esters represented by the general formula:

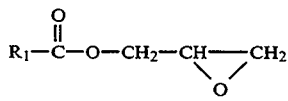

(where $R_1$ is a hydrocarbon group having an olefinic unsaturated bond);

ii) unsaturated glycidyl ethers represented by the general formula:

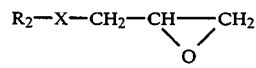

(where X is

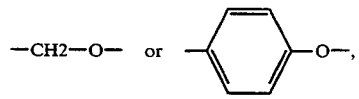

and $R_2$ is a hydrocarbon group having an olefinic unsaturated bond); and iii) epoxy alkenes represented by the general formula:

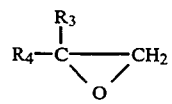

(where $R_3$ is a halogen atom or a hydrocarbon group, and $R_4$ is a hydrocarbon group having an olefinic unsaturated bond).

Specific examples of the epoxy group containing unsaturated monomer include: glycidyl esters such as glycidyl acrylate, glycidyl methacrylate, monoglycidyl itaconate, monoglycidyl butenetricarboxylate, diglycidyl butenetricarboxylate, triglycidyl butenetricarboxylate, and glycidyl esters of α-chloroallyl, maleic acid, crotonic acid, fumaric acid, etc.; glycidyl ethers such as vinyl glycidyl ether, allyl glycidyl ether, glycidyloxyethyl glycidyl ether, styrene-p-glycidyl ether, etc.; and p-glycidylstyrene, 3,4-epoxy-1-butene, 3, 4-epoxy-3-methyl-1-butene, 3, 4-epoxy-1-pentene, 3, 4-epoxy-3-methyl-1-pentene, 5, 6-epoxy-1-hexene, 1, 2-epoxy-4-cyclohexene, etc.

Examples of the copolymerizable olefinic monomer than can be used in the present invention include olefins such as ethylene, propylene, isobutylene, 1-butene, butadiene, methylpentene, cyclopentene, cyclopentadiene and isoprene, and vinyl monomers such as vinyl alcohol, vinyl acetate and alkyl (meth)acrylate esters.

The epoxy group containing olefinic co-polymer which is component (a) of the binder system of the present invention is typically prepared by known radical copolymerization. In another method that can be used, a radical generator is allowed to be present in an olefinic homo- or copolymer and an epoxy group containing unsaturated monomer is grafted onto the olefinic homo- or copolymer in the presence of absence of a solvent or dispersion medium. Particularly in the case where grafting is performed in a molten state, a melt blender such as an extruder, a kneader or a Banbury mixer may be used and this enables the desired epoxy group containing olefinic copolymer to be prepared within a short time by a simplified process.

Examples of the epoxy group containing olefinic copolymer which is presented herein include binary copolymers such as an ethylene-glycidyl (meth)acrylate copolymer, a propylene-glycidyl (meth)acrylate copolymer and a butyleneglycidyl (meth)acrylate copolymer, and terpolymers such as an ethylene-vinyl acetate-glycidyl (meth)acrylate copolymer, a propylene-vinyl acetate-glycidyl (meth)acrylate copolymer, an ethylene-acrylate ester-glycidyl (meth)acrylate copolymer and a propylene-acrylate ester-glycidyl (meth)acrylate copolymer.

The epoxy group containing olefinic (co)polymer contains at least one epoxy group containing unsaturated monomer in the molecule. Preferably, the epoxy group containing unsaturated monomer is contained in an amount of 0.02–30 wt %.

The polymer containing at least one epoxy group in the molecule has preferably a molecular weight of ca. 2,000–500,000. Below 2,000, the molded part lacks strength and it is prone to crack during molding or it will deform during debinding (removal of the binder). Above 500,000, the compound has such high melt viscosity that its moldability will deteriorate. More preferably, the molecular weight of the polymer at issue is in the range of 50,000–300,000.

In the present invention, polymers other than the aforementioned epoxy group containing olefinic (co)-polymer can be used as component (b) of the binder system. Such polymers are preferably added in order to facilitate the removal of the binder system of the present invention for use in the injection molding of sinterable powders, and they may be of any type that can be removed by heating or with the aid of solvents. Preferred examples of such polymers include those which are soluble in "debinding" solvents that will not dissolve the resins that have at least one epoxy group in the molecule, as well as those which have a different thermal decomposition temperature from the polymers having at least one epoxy group in the molecule so that no blistering or cracking will occur on account of rapid decomposition by the heat applied for binder removal. Specific examples of polymers as component (b) include: polyolefins such as PE, PP, polyisobutylene, ethylene-propylene copolymer, polymethylpentene, ethylene-butene copolymer, styrene-ethylene-butylene-styrene copolymer, EVA, EEA, EMA, EMMA, chlorinated PE and polybutene-1; styrenic resins such as polystyrene, poly-α-methylstyrene, styrene-acrylonitrile copolymer, styrene-methyl (meth) acrylate copolymer, styrene-ethyl (meth)acrylate copolymer, styrene-isopropyl (meth)acrylate copolymer, styrene-n-butyl (meth)acrylate copolymer, styrene-ethylene-butadiene-styrene copolymer (SEBS) and acrylonitrile-butadiene-styrene copolymar (ABS); acrylic resins such as polymethyl (meth)acrylate, polyethyl (meth)acrylate, poly-n-butyl (meth)acrylate, polyisobutyl (meth)acrylate, poly-2-ethylhexyl (meth)acrylate, polypropyl (meth)acrylate, polyisopropyl (meth)acrylate, poly-n-butyl (meth)acrylate, polyisobutyl (meth)acrylate, polycyclohexyl (meth)acrylate, polyethylhexyl (meth)acrylate, poly-n-dodecyl (meth)acrylate, polystearyl (meth)acrylate, methyl (meth)acrylate-butyl (meth)acrylate copolymer, and butyl methacrylate-2-ethylhexyl methacrylate copolymer; polyvinyl acetals such as polyvinyl formal, polyvinyl butyral, polyvinyl acetoacetal and polyvinyl propional; polyvinyl ethers such as polyvinyl ether and polyvinyl butyl ether; polyethers such as polyethylene oxide, polyoxymethylene, polypropylene oxide, polytetramethylene glycol, and ethylene oxide-propylene oxide copolymer; polyesters such as polyethylene terephthalate, polybutylene terephthalate and polyethylene sebacate; as well as polyamides, polycarbonates, polyurethanes, phenolic resins and furan resins. These polymers preferably have molecular weights in the range of 2,000–500,000, more preferably 50,000–300,000. Below 2,000, the molded part lacks strength and is prone to cracking during molding; above 500,000, the compound has such high melt viscosity that its moldability will deteriorate.

In a more preferred embodiment, a homopolymer and/or a copolymer that are prepared by (co)polymerizing one or more monomers selected from among acrylate esters, methacrylate esters and styrene is used as the resin other than the resin (a) having at least one epoxy group in the molecule. When these polymers are to be used, an ethylenic polymer is preferably used as the resin having at least one epoxy group in the molecule. With this combination of resins or polymers, styrenic and acrylic resins can be readily removed from the molded part using suitable solvents such as toluene, chloroform and methylene chloride; even in the case of debinding with heat; the styrenic and acrylic resins having lower decomposition temperatures will first decompose and the ethylenic resins will then decompose; thus, rapid generation of decomposition gases can be sufficiently suppressed to prevent effectively the occurrence of blistering and cracking during the removal of the binder.

In addition to resins (a) and (b) described above, an organic compound having a lower molecular weight, or organic compound (c) having a molecular weight of up to 2000, is used as a third component of the binder system of the present invention. Low-molecular weight components that can be used in the binder system include waxes, higher aliphatic acids, higher alcohols, higher aliphatic acid amides; aliphatic acid esters, phthalic acid esters, adipic acid esters and sebacic acid esters. More specific examples of the useful low-molecular weight component include synthetic waxes such as normal paraffin wax, microcrystalline wax, oxidized waxes, petrolatum, oxidized petrolatum, polyethylene wax, polypropylene wax and montan wax derivatives, and natural waxes such as montan wax, carnauba wax, whale wax, beeswax, wool wax, candelilla wax, Japan wax, ouricury wax, sugar cane wax, ozokerite wax, ceresin wax and lignite wax. These waxes preferably have molecular weights of 300–2000. Below 300, adequate strength cannot be imparted to the molded part whereas, above 2000, the efficiency of binder removal will decrease. Waxes are most commonly used as a binder component since they are highly miscible with the resins and inexpensive at that.

Higher fatty acids that can be used include myristic acid, palmitic acid, lauric acid, baltimoic acid, isostearic acid, stearic acid, arachidic acid, arachidonic acid, behenic acid, oleic acid, linolic acid and linoleic acid. These are effective as lubricants; however, if they are contained in excessive amounts, heavy bleeding will occur in the molded part and, in addition, its strength will decrease. Hence, the proportion of the higher aliphatic acids is preferably held not more than 10 wt % of the total amount of the binder system.

Higher alcohols that can be used include monohydric alcohols such as cetyl alcohol, lauryl alcohol, ceryl alcohol, melissyl alcohol, myristryl alcohol and stearyl alcohol, and dihydric alcohols such as ethylene glycol and polyethylene glycol.

Higher fatty acid amides that can be used include stearic acid amide, lauric acid amide, erucic acid amide, linolic acid amide, behenic acid amide, palmitic acid amide, oleic acid amide, methylene bisstearic acid amide, hardened beef tallow acid amide, coconut fatty acid amide, methylenebisamide, ethylenebisamide and ethylenebisstearic acid amid. These amides are fairly miscible with the resins and can be incorporated, without any problem, in larger amounts than aliphatic acids and alcohols.

Fatty acid esters that can be used include the esters of $C_{12-22}$ aliphatic acids with $C_{1-22}$ monohydric alcohols or polyhydric alcohols such as glycols. Specific examples include butyl stearate, butyl laurate, octyl palmitate, isopropyl palmitate, cetyl palmitate, myricyl palmitate, myricyl cerotinate, triethylene glycol-2-ethyl butyrate, stearic acid monoglyceride, sorbitan trioleate, peanut oil, soybean oil, coconut oil, palm oil, linseed oil, hydrogenated oil, fish oil and animal oils.

Phthalic acid esters, adipic acid esters, sebacic acid esters, etc. are commonly used as plasticizers in plastics and they also exhibit good performance as component of the binder system for the injection of sinterable powders. Specific examples include diethyl phthalate, dibutyl phthalate, di-n-octyl phthalate, di-2-ethylhexyl phthalate, dinonyl phthalate, diisononyl phthalate, didecyl phthalate, diisodecyl phthalate, diundecyl phthalate, butylbenzyl phthalate, octylbenzyl phthalate, butyloctyl phthalate, dibutyl adipate, di-2-ethylhexyl adipate, didecyl adipate, diisodecyl adipate, octyldecyl adipate, dibutyl sebacate, dibutyl sebacate, di-2-ethylhexyl sebacate and butylbenzyl sebacate. Also useful are maleic acid esters such as dibutyl maleate and di-2-ethylhexyl maleate, as well as fumaric acid esters such as dibutyl fumarate. Other esters that can be used include phosphoric acid esters such as triethyl phosphate, tributyl phosphate, trioctyl phosphate and triphenyl phosphate, boric acid esters such as triethyl borate, tributyl borate and trioctyl borate, and higher aliphatic acid salts such as calcium stearate, magnesium stearate and aluminum stearate.

The low-molecular weight compounds as component (c) are incorporated in amounts ranging from 20 to 80 wt % of the total amount of the binder system. Below 20 wt %, the compound will flow only poorly and its moldability deteriorates; above 80 wt %, it becomes difficult to clean the molded part efficiently.

Compound (c) has a molecular weight of up to 2000, preferably 300–1000. Below 300, adequate strength cannot be imparted to the molded part and above 1,000, the moldability of the compound will deteriorate and it will become difficult to remove the binder from the molded parts. If the molecular weight of compound (c) exceeds 2,000, precise molding is impossible and it takes an extremely long time to complete the debinding step, making it impossible no attain the principal object of the present invention, i.e., producing precise parts of complex shapes with high accuracy and efficiency.

If debinding (binder removal) is to be performed by solvent extraction, the organic compound having a molecular weight of up to 2,000 is desirably soluble in solvents that will not dissolve the resin having at least one epoxy group in the molecule. If debinding is to be performed under heating, the organic compound having a molecular weight of up to 2,000 is preferably composed of two or more kinds having different boiling points in order to insure that no defects such as deformation and blistering will occur in the debinding step. Such defects are prone to occur when the low-molecular weight component is removed at temperatures lower than the decomposition point of the resins and, hence, in order to avoid those defects, the range of temperatures at which the low-molecular weight component is removed is desirably widened by incorporating two or more organic compounds having molecular weights of up to 2,000.

Component (a) of the binder system of the present invention, or the olefinic polymer with a molecular weight in excess of 2000 that has at least one epoxy group in the molecule, is contained in an amount of 3–80 wt % in the binder system. Below 3 wt %, the surface of a sinterable powder cannot be completely covered with the resin and the wettability of the sinterable powder with the binder system is not improved. As a result, the molded part has low strength and is liable to break, or it will deform in a subsequent debinding (binder removal) step, or blisters or cracks will develop. Above 80 wt %, the compound becomes so viscous that not only will its moldability deteriorate but also debinding defects such as cracking and blistering will readily occur.

In a particularly preferred embodiment, the resin components (a) and (b) are incorporated in nearly equal amounts in the binder system. The epoxy group containing polymer (a) may typically be contained in an amount of 10–70 wt %, preferably 20–40 wt % which is sufficient to cover the surface of a sinterable powder fully, whereas the polymer (b) which is other polymer than (a) may typically be contained in an amount of 10–60 wt %, preferably 20–40 wt %. The sum of the two polymer components (a) and (b) is preferably in the range of 20–70 wt %, preferably 30–60 wt %, with the remainder being occupied by the organic compound (c) having a molecular weight of up to 2,000.

The compound of the present invention for use in the injection molding of sinterable powders may optionally contain, as appropriate, various additives such as an antioxidant, a fluidizer and a surfactant.

The molding compound of the present invention is preferably prepared by mixing 100 part by weight of a metal powder, a ceramic powder or a cermet powder with 3-20 parts by weight of the binder system described in the preceding paragraphs. If the binder system is contained in less than 3 parts by weight, it is incapable of filling all the intersticies between the particles of the powder and the resulting compound will flow only poorly to make subsequent injection molding difficult to accomplish. If the content of the binder system exceeds 20 parts by weight, the flowability of the compound is sufficiently good to provide ease in injection molding but, on the other hand, the molded part is not capable of retaining its shape in subsequent debinding.

There is no limitation on the method of mixing the binder system of the present invention with a metal powder, a ceramic powder or a cermet powder; a sinterable powder of interest may be mixed with all the components of the binder system in one step or, alternatively, all the components of the binder system are first mixed together and then a sinterable powder of interest is fed in and mixed with the binder system. If desired, certain components of the binder system may first be mixed with a sinterable powder of interest and the remaining component or components is thereafter added. Any type of mixers that are capable of mixing the binder system with sinterable powders may be used and they include, for example, a Henschel mixer, Banbury mixer, kneader, roll mill, single-screw extruder and a twin-screw extruder.

The compound prepared by mixing the binder system of the present invention with a sinterable powder is either ground or granulated to form a molding material to be fed into an injection molding machine. The injection molding machine may be of a common type that is used to mold thermoplastics. Molding is typically performed at injection temperatures in the range of 100°-250° C. If the injection temperature is excessive, significant deterioration occurs in the components of the binder system and undesired changes will occur in the moldability and debindability of reclaimed compounds. Hence, the preferred range of injection temperatures is from 100° to 180° C.

Debinding of the molded part can be achieved by either heating or solvent extraction. In the first case, debinding may be performed in a nitrogen, argon, hydrogen or otherwise stream or the binder system may preferably be removed under vacuum. The rate of temperature elevation depends on the thickness of the molded part and it typically ranges from 10° C./h to 100° C/h. A maximum debinding temperature is preferably in the range of 450°-800° C. Below 450° C., the epoxy group containing olefinic (co)polymer will not be decomposed and removed efficiently. Even if the molded part is heated to a temperature beyond 800° C., the rate at which the epoxy group containing olefinic (co)polymer decomposes will not be markedly increased and, instead, the debinding time is simply extended.

In debinding by solvent extraction, one or more species of the low-molecular weight component other than the epoxy group containing olefinic (co)polymer are removed by extraction with a suitable solvent and, thereafter, heat is applied to remove the remaining components of the binder system.

Sintering may be subsequently performed in the same furnace as where the debinding step is carried out; alternatively, the molded body may be taken out of the debinding furnace and transferred to a separate sintering furnace. Sintering is typically performed at a temperature of 800°-2000° C. for a period of from 10 min to 6 h; the sintering conditions including the sintering atmosphere are determined, as appropriate, in accordance with the material and characteristics of the sinterable powder to be used.

When powders of iron or iron base alloys having a low content of nickel, etc. are used as the sinterable powder, the sintering may practically be carried out at a temperature of 1100°-1450° C. for a period of from 10 min to 4 h under vacuum or such an inert atmosphere as hydrogen, nitrogen and argon, preferably under conditions of 1200°-1400° C. for 30 min—2 h under vacuum or hydrogen atmosphere.

When the sinterable powder is powder of stainless steel, the sintering is performed at a temperature of 1100°-1450° C. for a period of 10 min to 4 h under vacuum or an atmosphere of hydrogen or argon, however, it may preferably be conducted by subjecting firstly to conditions of 1100°-1250° C. for 30 min—2 h under vacuum and then to those of 1250°-1400° C. for 30 min—2 h under argon atmosphere.

The other features of the binder system and compound of the present invention are described below as they bear importance to the objects of the present invention.

As will be described in the Examples, compared to EVA, EEA, polyethylene, polypropylene, polystyrene, acrylic resins and other polymers that have conventionally been used as binders, the epoxy group containing copolymer is characterized by high levels of residual carbon in the sinterable powder after separation with a solvent; the difference is 0.01-0.08% for a metal powder and 0.48-0.56% for a ceramic powder. This is probably because the covalent bond due to the epoxy group helps the resin bind strongly to the surface of a sinterable powder. Consider, for example, glycidyl methacrylate and glycidyl acrylate; they are different from the heretofore used ethylene-vinyl acetate copolymer (EVA) and ethylene-ethyl acrylate copolymer (EEA) in that they are not bound to hydroxyl groups on the surface of a sinterable powder via hydrogen bounds but they would produce much stronger bounds via covalent bonds as illustrated below:

(Scheme 1)

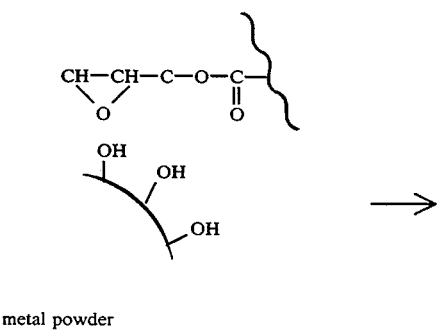

metal powder

-continued
(Scheme 1)

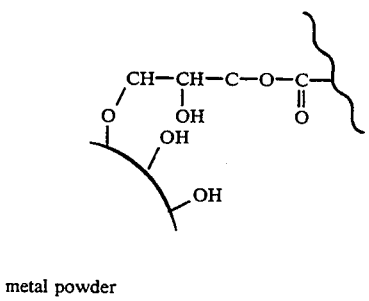

metal powder

Epoxy group containing resins are known to be useful as binders in the molding of sinterable powders, as disclosed in Japanese Patent Laid-Open Publication (kokai) SHO Nos. 59-182266 and 57-38896. However, the teachings of these patents are not based on the interaction between the resin and a sinterable powder of interest; in addition, the resulting material is in a slurry form of the type used for shaping by doctor blade coating, and is not capable of being formed by injection molding. Hence, the cited material differs in nature from sinterable compounds for injection molding of the present invention. Japanese Patent Laid-Open Publication (kokai) HEI No. 1-257158 teaches a compound for use in the manufacture of shaped ceramic parts that contains as an essential ingredient a compound containing at least one epoxy group in the molecule. However, this epoxy group containing compound differs from the epoxy group containing olefinic polymer to be used in the present invention in that a polyalkylene carbonate is contained as the essential part of a binder resin component, with the epoxy compound being recommended to have a lower molecular weight than said polyalkylene carbonate. The present invention offers an entirely novel binder system for use in the injection molding of sinterable powders that is a resin prepared by copolymerizing epoxy group containing unsaturated monomers on the basis of the principle of bonding descirbed in the preceding paragraph.

This is discussed more specifically below. The dispersibility of a sinterable powder as it is mixed with the binder system, the flowability of the resulting compound and the strength of the molded part are largely dependent on the wettability of the surface of the sinterable powder with the binder system, namely, the degree of interaction between the powder and the binder. A chemical covalent bond is one of the strongest bonds that can occur and the resin prepared by copolymerizing epoxy group containing unsaturated monomers that are capable of forming covalent bonds with hydroxyl groups on the surface of a sinterable powder of interest, namely, the epoxy group containing olefinic (co)-polymer defined herein, will help produce a binder system of very good performance that is suitable for use in the injection molding of sinterable powders.

If this epoxy group containing olefinic (co)polymer is used as a component of the binder system, a sinterable powder is dispersed very efficiently when it is mixed with the binder system and a uniform molding compound can be produced. In addition, there will be no deterioration in the flowability of the compound due to that presence of residual agglomerates and this helps reduce the amount of binder system that must be used.

Furthermore, the mechanism by which the epoxy group containing olefinic (co)polymer wets the surface of the sinterable powder is through the strong covalent bond and, hence, the molded part is strong enough to be free from cracks and to experience only limited deformation during handling. The good wettability between the epoxy group containing olefinic (co)polymer and the sinterable powder offers another advantage in that only a few defects will occur in the debinding step and, compared to the heretofore used binders or binder systems, the deformation of the molded part is negligible and no defects such as blisters, voids and cracks will take place during debinding.

If desired, both the epoxy group containing olefinic (co)polymer and a polymer other than this may be incorporated as two components of the binder system. Preferably, the polymer other than the epoxy group containing olefinic (co)polymer is a homopolymer and-/or a copolymer that are prepared by (co)polymerizing one or more monomers selected from among acrylate esters, methacrylate esters and styrene. Such homo- and copolymer are highly depolymerizable, so they are effective in suppressing the occurrence of debinding defects at the temperature at which the resin is decomposed for removal.

If the epoxy group containing olefinic (co)polymer is the only resin component of the binder system, defects such as cracking or surface shedding may occur in the molded part in a temperature range above 300° C. at which the resin is decomposed for removal. This is because resin decomposition starts abruptly at a certain temperature since only one kind of resin component is present. Polyethylene, polypropylene, ethylenic copolymers and propylenic copolymers, when heated, will start to decompose abruptly at 350°–400° C. through random degradation, whereas poly (meth)acrylate esters, polystyrene and styrene-(meth)acrylate ester copolymers will start to decompose gradually at 300°–350° C. through depolymerization. Hence, in the present invention, it is recommended that these resins be incorporated in the binder system to expand the range of resin decomposition temperatures, thereby suppressing the occurrence of debinding defects. This makes it possible to elevate the temperature at a higher rate in the debinding step, thereby shortening the time required to complete the removal of the binder system.

If an ethylenic or a propylenic copolymer is used as the epoxy group containing olefinic (co)polymer, another problem occurs and that is an increased chance of cracks of developing in the molded part, particularly when it is a thin-walled object. However, this problem can also be effectively solved by incorporating poly(-meth)acrylate esters, polystyrene or styrene-(meth)acrylate ester compolymers. It should be particularly noted that when a plasticizer such as the aforementioned phthalic acid ester or adipic acid ester is used as the low-molecular weight component, the flowability of the compound is sufficiently increased to achieve marked improvement in its moldability.

On the other hand, poly(meth)acrylate esters, polystyrene and styrene-(meth)acrylate ester copolymers do not wet the sinterable powders very effectively; therefore, the proportion of these polymers is preferably adjusted not to exceed 70% in order to insure that they will not impair the effectiveness of the epoxy group containing olefinic (co)polymer.

In the binder system of the present invention, organic compound (c) which has a lower molecular weight than resin components (a) and (b) is added as a third component. The primary reason for adding this component (c) is that if the binder system is composed of the resin components alone, the molded part is difficult to clean; another reason is that the component (c) helps further improve the fluidity of the compound being molded.

Thus, the present invention has been accomplished on the basis of the efforts made by the inventors to achieve improvements in moldability and efficiency of binder removal while insuring to exploit the performance of the epoxy group containing olefinic (co)-polymer. The binder system offered by the present invention far excels the conventional types.

EXAMPLES

The following examples are provided for the purpose of further illustrating the present invention but are in no way to be taken as limiting. Stated below are the starting monomer components for the various binder systems used in the Examples, as well as the methods of the various evaluations conducted in the Examples.

1) Raw materials for binder systems

Table 1 shows the starting monomer components for the resins used as binder components, the ratios (wt %) of their copolymerization and the average molecular weights of the resins. The paraffin wax used had an average molecular weight of 380. The other components used were dibutyl phthalate (DBP), dioctyl phthalate (DOP), stearic acid, stearyl alcohol and behenic acid amide.

2) Method of evaluating physical property

The amount of organic matter bound to metal powder, ceramic powder, or cermet powder:

A binder system was extracted from a ground compound on a Soxhlet apparatus with a solvent toluene and the amount of residual carbon in the separated powder was measured. The difference between the measured amount of carbon and the initial carbon content of the starting powder (or the increase in the carbon content of powder) is due to the resin portion that was not extracted from the powder with toluene; the value of this difference is an index for the evaluation of the intensity of interaction between the binder system and the powder of interest.

3) Debinding test

Figure 2A:
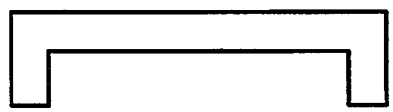
Figure 2A:
Figure 2B:
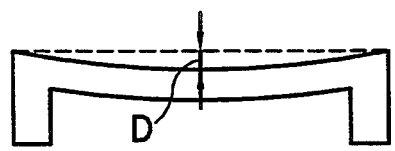

A compound was injection molded into an object (molded part) as shown in FIG. 1 which consisted of a flat plate portion 1 (4 mm thick) and two support areas 2 at opposite ends. For the mold of other portions of the object, see FIG. 1. Referring to FIG. 1, portion 1 of the object had a thickness T of 4 mm. Portion 2 of the object had a height H of 10 mm. The object had a width W of 25 mm and a length L of 40 mm. This object was used as a test specimen, which was heated under vacuum in an oven from room temperature up to 250° C. over 12 h and held at 250° C. for 1 h. Thereafter, nitrogen was supplied into the oven, where the specimen was heated up to 500° C. over 1 h in a nitrogen flow, held at 500° C. for 1 h and subsequently cooled down. FIG. 2A is a cross section of the molded part from which the binder system was not removed, and FIG. 2B is a cross section of the molded part after binder removal (debinding). To evaluate the amount of deformation due to debinding, the deformation D that occurred in the center of the flat plate portion 1 of the molded part as a result of debinding was measured. The molded part deformed under its own weight. After debinding, the molded part was further examined for the presence of any debinding defects such as blistering and cracking.

Examples 1-10 and Comparative Examples 1-5

A water-atomized powder of stainless steel having an average particle size of 9.5 μm was used as a metal powder. The stainless steel powder and other necessary components were mixed in the proportions shown in Table 2 to prepare injection molding compounds. Various binder systems were used but they were all contained in an amount of 9.8 parts by weight per 100 parts by weight of the stainless steel powder.

The ingredients were mixed with a pressure kneader. With this kneader heated at 140° C., the binder components were charged and melted; then, the metal powder was charged slowly until the entire portion of it was fed; thereafter, the ingredients were mixed for 1 h and the mixture was ground to form an injection molding compound. By the methods already described, the molding compound was measured for the amount of organic matter bound to the powder and it was also subjected to a debinding test. The results are shown in Table 2.

In Examples 1-3, an ethylene-glycidyl methacrylate copolymer (E-GMA) in which the copolymerization ratio of glycidyl methacrylate was 5 wt % according to the present invention was used as a binder component; in Examples 1 and 2, polystyrene was incorporated as another binder component and in Example 3, polybutyl methacrylate was incorporated as a second binder component. In those examples, three low-molecular weight components, i.e., paraffin wax, stearic acid and DBP, were also added to prepare binder systems. Since the proportions of the respective components were appropriate, the molded parts produced by injection molding the resulting compounds were sound and no defects such as blistering and cracking were found in the molded parts after debinding. Furthermore, the molded parts experienced very small amounts of deformation during debinding. In Example 4, both an ethylene-glycidyl acrylate copolymer (E-GA) and polystyrene were used as binder components and in Example 5, both an ethylene-vinyl acetate-glycidyl methacrylate copolymer (E-GMA-VA) and polybutyl methacrylate were used as binder components. In these examples, too, epoxy group containing copolymers having an appropriate copolymerization ratio of glycidyl acrylate or glycidylmethacrylate were used as binder components; furthermore, the binder systems prepared in those examples contained polystyrene or polybutyl methacrylate and, hence, they imparted good moldability to the molding compounds while exhibiting good performance in debinding step.

In Examples 6 and 7, stearyl alcohol, behenic acid amide, dioctyl phthalate (DOP), etc. were additionally used as the low-molecular weight component; the binder systems prepared in these examples also imparted good moldibility to the molding compounds while exhibiting good performance in debinding step.

In Examples 8 and 9, only an epoxy group containing olefinic copolymer was used as resin components. These compounds also had good moldability, and no defects were found in the debound parts. In Example 10, both propyleneglycidylmetacrylate copolymer and polybutylmetacrylate were used as resin components. The proportions of components were appropriate, so that the binder system exhibited good properties.

Furthermore, the debound parts of Examples 1–10 were sintered under vacuum up to 1200° C. over 2 h, held at 1200° C. for 1 h and then, in argon, heated up to 1350° C. over 20 min, and held at 1350° C. The sintered parts, the density of which was 97% of the theoretical density, had satisfactory appearances.

In Comparative Examples 1 and 2, an ethylene-glycidyl methacrylate copolymer in which the copolymerization ration of glycidyl methacrylate was 5 wt % was used as in Examples 1–3. However, in Comparative Example 1, the content of said ethylene-glycidyl methacrylate copolymer was 2 wt % which was less than the lower limit 3 wt % specified by the present invention; hence, the desired binding effect of the ethylene-glycidyl methacrylate was not exhibited fully and the molded part was brittle enough to experience cracking. In Comparative Example 2, the sum of the contents of the organic compounds having molecular weights up to 2000 (i.e., paraffin wax, stearic acid and DBP) was 8 wt % which was less than the lower limit 20 wt % specified by the present invention; hence, the molding compound flowed only poorly and insufficient mold filling occurred; furthermore, the molded part experienced heavy deformation during subsequent debinding.

In Comparative Examples 3, 4 and 5, binder systems were prepared incorporating EVA (ethylene-vinyl acetate copolymer), EEA (ethylene-ethyl acrylate copolymer) and PE (polyethylene) which were conventional binder components. In Comparative Examples 3 and 4, EVA and EEA were respectively used as resin components. The molding compounds containing these binder components had such a good flowability that their moldability was good enough to produce sound molded parts. However, when the molded parts were subjected to a debinding step, both experienced blistering and sagging. In Comparative Example 5, a binder system consisting of PE, wax and stearic acid was prepared. The compound using this binder system was brittle and the molded part was by no means satisfactory in the presence of cracks. In Comparative Example 6, an epoxy group containing compound was incorporated in the binder system but since its molecular weight was less than 2,000, the molded part developed defects and deformed extensively during debinding.

The increase in the carbon content of powder was 0.01–0.03 wt % for the case where it resulted from EVA, EEA and PE (Comparative Examples 3–5); on the other hand, the amount of residual carbon in the powders separated in Examples 1–7 where epoxy group containing copolymers were used was as high as 0.06–0.09 wt %, indicating the strong bond between the binder system and the powder. This would be because glycidyl methacrylate or glycidyl acrylate bonded to the surface of powder through the mechanism shown by scheme 1 hereinabove: this shows eloquently that the resins offered by the present invention wets sinterable powders, especially metal powders, by a sufficient degree to provide satisfactory binder systems.

Example 11 and Comparative Examples 7 and 8

Table 3 shows exemplary formulations for binder systems that are to be removed by solvent extraction. The powders used were the same as those used in Examples 1–10, and mixing of the ingredients and injection molding of the resulting compounds were performed as in Examples 1–10. For debinding, the injection molded objects were held in n-heptane for 4 h, recovered and heated. The thermal debinding consisted of heating the molded parts from room temperature up to 500° C. in a nitrogen flow over 6 h, holding the molded parts at 500° C. for 1 h, and cooling them.

In Example 11, a molding compound was prepared using a binder system that incorporated an ethylene-glycidyl methacrylate copolymer in which the copolymerization ratio of glycidyl methacrylate was 5 wt %. The compound showed good mold filling and the molded part had no cracks at all. The molded part was debound by immersion in n-heptane for 4 h and subsequent thermal debinding could be performed without causing adverse effects on the appearance of the molded part. In Comparative Example 6, a binder system to be removed by solvent extraction was formulated from polyethylene and hydrogenated palm oil; in Comparative Example 7, polyethylene was replaced by polypropylene. The compounds of these comparative examples were poor in moldibility and cracks developed in the molded parts. Upon solvent extraction, the molded parts became so brittle that they broke during handling for changing into the debinding furnace.

Further, the molded part after debinding of Example 11 was sintered in the same manner as those of Examples 1–10, and it was found that properties of the sintered material obtained was satisfactory.

TABLE 1

| | Ethylene | Glycidyl methacrylate | Glycidyl acrylate | Vinyl acetate | Ethyl acrylate | Butyl methacrylate | Styrene | Propylene | Molecular weight ($\times 10^4$) |
|---|---|---|---|---|---|---|---|---|---|
| E-GMA | 95 | 5 | | | | | | | 20 |
| E-GA | 94 | | 6 | | | | | | 23 |
| E-GMA-VA | 84 | 6 | | 10 | | | | | 18 |
| P-GMA | | 7 | | | | | | 93 | 7 |
| EVA | 94 | | | 6 | | | | | 22 |
| EEA | 93 | | | | 7 | | | | 20 |
| PE | 100 | | | | | | | | 15 |
| PBMA | | | | | | 100 | | | 20 |
| PS | | | | | | | 100 | | 6 |
| PP | | | | | | | | 100 | 10 |

TABLE 2-1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| E-GMA | 20 | 30 | 40 | | | 35 | 40 | 60 | | |
| E-GA | | | | 40 | | | | | | |
| E-GMA-VA | | | | | 30 | | | | 65 | |
| P-GMA | | | | | | | | | | 30 |
| PS | 20 | 30 | | 20 | | 20 | | | | |
| PBMA | | | 30 | | 20 | | 20 | | | 20 |

TABLE 2-1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Paraffin wax | 44 | 24 | 19 | 24 | 34 | 30 |  | 20 | 15 | 34 |
| Stearic acid | 1 | 1 | 1 | 1 | 1 |  |  |  | 1 | 1 |
| Stearyl alcohol |  |  |  |  |  | 5 |  |  |  |  |
| Behenic acid amide |  |  |  |  |  |  | 20 |  |  |  |
| DBP | 15 | 15 | 10 | 15 | 15 | 10 | 15 | 20 | 19 | 15 |
| DOP |  |  |  |  |  |  | 5 |  |  |  |
| Appearance of molded part | good | good | good | good | good | good | good | good | good | good |
| Appearance of debound part | good | good | good | good | good | good | good | good | good | good |
| Deformation (μm) | 90 | 80 | 110 | 120 | 70 | 80 | 70 | 150 | 140 | 90 |
| Increase in the carbon content of powder (wt %) | 0.06 | 0.07 | 0.08 | 0.09 | 0.08 | 0.08 | 0.06 | 0.08 | 0.09 | 0.07 |

TABLE 2-2

|  | Com. Ex. 1 | Com. Ex. 2 | Com. Ex. 3 | Com. Ex. 4 | Com. Ex. 5 | Com. Ex. 6 |
|---|---|---|---|---|---|---|
| E-GMA | 2 | 40 |  |  |  |  |
| E-GA |  |  |  |  |  |  |
| PS | 35 | 52 |  |  |  | 30 |
| EVA |  |  | 60 |  |  |  |
| EEA |  |  |  | 60 |  |  |
| PE |  |  |  |  | 60 |  |
| Paraffin wax | 47 | 7 | 24 | 24 | 39 | 34 |
| Stearic acid | 1 | 1 | 1 | 1 | 1 | 1 |
| DBP | 15 |  | 15 | 15 |  | 15 |
| Epoxy compound |  |  |  |  |  | 20 |
| Appearance of molded part | cracked | insufficient mold filling | good | good | cracked | good |
| Appearance of debound part | — | — | blisters and cracks | blisters and cracks | — | blisters and cracks |
| Deformation (μm) | — | ∞ | ∞ | ∞ | — | 1500 |
| Increase in the carbon content of powder (wt %) | 0.05 | 0.09 | 0.02 | 0.03 | 0.01 | 0.04 |

(Note) Epoxy compound: $CH_2\underset{O}{\overset{}{\diagdown\diagup}}CH-CH_2-O-(CH_2-\underset{CH_3}{\overset{|}{CH}}-O)_7-CH_2-CH\underset{O}{\overset{}{\diagdown\diagup}}CH_2$

TABLE 3

|  | Ex. 11 | Comp. Ex. 7 | Comp. Ex. 8 |
|---|---|---|---|
| E-GMA | 30 |  |  |
| PBMA | 30 |  |  |
| PE |  | 40 |  |
| PP |  |  | 40 |
| Paraffin wax | 30 |  |  |
| DBP | 10 |  |  |
| Hydrogenated palm oil |  | 60 | 60 |

Examples 12 and 13 and Comparative Examples 9–11

Compounds for use in the injection molding of ceramic powders were prepared using binder systems having the formulations shown in Table 4. The preparation started with heating a pressure kneader to 140° C.; then, the binder system (12 parts by weight) was charged into the kneader and melted; thereafter, 100 parts of a mixed powder consisting of 94 wt % of a silicon nitride powder (average particle size, 1.0 μm), 3 wt % of a yttrium oxide powder (average particle size, 0.4 μm) and 3 wt % of an oxide aluminum powder (average particle size, 0.3 μm) was slowly charged into the kneader. When all portions of the powders were charged, they were mixed for 1 h and the mixture was recovered, cooled and ground. The amount of organic matter bound to the powder was measured and the molded parts were subjected to a debinding test (for the methods of the measurement and the test, see above). The results are shown in Table 4.

In Comparative Example 9, the powder was wetted with the binder system so poorly that the compound separated into the powder and the binder when it was injection molded and further molding was impossible. When EVA and EEA were used as binder components (in Comparative Examples 10 and 11, respectively), satisfactory molded parts were produced but they experienced either blistering or heavy deformation during subsequent debinding. On the other hand, as is clear from Examples 12 and 13, the use of binder systems incorporating an epoxy group containing resin helped provide compounds that had satisfactory moldability; hence, the compounds could be molded and then debound without developing any defects such as blisters and cracks. The deformation occurring in the debinding step was also small. The increase in the carbon content of powder was as high as 0.52–0.58 wt % in Examples 12 and 13 which used the epoxy group containing resins; this demonstrates that the powder was wetted satisfactorily with the binder system.

TABLE 4

|  | Ex. 12 | Comp. Ex. 9 | Ex. 13 | Comp. Ex. 10 | Comp. Ex. 11 |
|---|---|---|---|---|---|
| E-GMA | 25 |  |  |  |  |
| E-GMA-VA |  |  | 25 |  |  |
| EVA |  |  |  | 25 |  |
| EEA |  |  |  |  | 25 |
| PE |  | 25 |  |  |  |
| PBMA | 25 | 25 | 25 | 25 | 25 |
| Paraffin wax | 30 | 30 | 30 | 30 | 30 |
| DBP | 20 | 20 | 20 | 20 | 20 |
| Appearance of | good | molding | good | good | good |

TABLE 4-continued

|  | Ex. 12 | Comp. Ex. 9 | Ex. 13 | Comp. Ex. 10 | Comp. Ex. 11 |
| --- | --- | --- | --- | --- | --- |
| molded part | | impossible | | | |
| Appearance of debound part | good | — | good | blisters and cracks | blisters and cracks |
| Deformation (μm) | 100 | — | 80 | 2500 | 2000 |
| Increase in the carbon content of powder (wt %) | 0.52 | 0.02 | 0.58 | 0.04 | 0.03 |

Examples 14-16 and Comparative Examples 12-16

Mixing, grinding, injection molding and debinding were conducted as in Examples 12 and 13 except that binder systems having the formulations shown in Table 5 were used. The results are also shown in Table 5. In Comparative Example 12, an epoxy group containing resin was used as a binder component but since its content was 1 wt % which was smaller than the lower limit 3% specified by the present invention, cracks developed in the molded part. In Comparative Examples 13 and 14, the sum of the contents of organic compounds having molecular weights of 2000 and below (i.e., paraffin wax, DBP and DOP) was 15 wt % which was smaller than the lower limit 20 wt % specified by the present invention; hence, the compounds had only poor moldability and, in addition, the molded parts deformed extensively in subsequent debinding. In Comparative Example 15, the sum of the contents of the organic compounds having molecular weights of 2000 and below was 85 wt % which was greater than the upper limit 80 wt % specified by the present invention; hence, the molded parts deformed extensively and had defects. In Comparative Example 16 using a polyethylene wax having a molecular weight of 3000 in the binder system, the molded part could not be debound without developing blisters or cracks; in addition, the molded part experienced extensive deformation during the debinding step. In contrast, both moldability and shape retention during debinding were satisfactory in Examples 14-16.

Example 17

Mixing, grinding and injection molding were performed as in Example 12 except that the binder system consisted of E-GMA, hydrogenated linseed oil and DBP in a weight ratio of 50:30:20. The molded part was immersed in heptane for 12 h to extract the greater part of the plasticizer, followed by vacuum drying for 30 min. The dried molded part was heated from room temperature up to 500° C. in a nitrogen flow over 4 h, held at 500° C. for 1 h and thereafter cooled down. The molded part did not experience any defects and it maintained a satisfactory appearance even after debinding with a solvent and subsequently with heat. The deformation occurring in the debinding steps was also small (10 μm). In the next step, the debound body was heated in an argon stream at a rate of 200° C./h and held at 1800° C. for 6 h to be sintered. The sinter had a density which was 98% of the theoretical and 1% had satisfactory appearance.

Comparative Example 17

The procedure of Example 17 was repeated except that E-GMA was replaced by PE. Several cracks developed in the compound as it was injection molded; furthermore, cracking occurred in the molded body when it was debound thermally, with an extensive deformation of 3500 μm.

Examples 18-20

The binder system used in these examples consisted of 33 wt % of E-GMA-VA, 22 wt % of PBMA, 20 wt % of paraffin wax (m.p. 55° C.) and 25 wt % of DBP. Using the ceramic powders shown in Table 6 with the binder system being used in the amounts also shown in Table 6, mixing, molding and debinding were conducted as in Example 12. The debound bodies were heated from room temperature at a rate of 200° C./h in an argon flow and sintered at the temperatures shown in Table 6 for the time periods also shown in Table 6. In whichever case, an immaculate satisfactory sinter was produced.

TABLE 5

|  | Ex. 14 | Com. Ex. 12 | Ex. 15 | Com. Ex. 13 | Com. Ex. 14 | Ex. 16 | Com. Ex. 15 | Com. Ex. 16 |
| --- | --- | --- | --- | --- | --- | --- | --- | --- |
| E-GMA | 30 | 1 | 65 | 45 | 85 | 5 | 5 | 30 |
| PE | | 29 | | | | 30 | | |
| PS | 25 | 25 | 10 | 40 | | 35 | 10 | 25 |
| Polyethylene wax | | | | | | | | 45 |
| Paraffin wax | 15 | 15 | 10 | 5 | 5 | 5 | 40 | |
| DBP | 10 | 10 | 5 | 5 | 5 | 5 | 20 | |
| DOP | 20 | 20 | 10 | 5 | 5 | 20 | 25 | |
| Appearance of molded part | good | cracked | good | insufficient mold filling | good | good | good | good |
| Appearance of debound part | good | — | good | good | good | good | blisters and cracks | blisters and cracks |
| Deformation (μm) | 120 | — | 90 | ∞ | 3300 | 110 | 2300 | ∞ |

(Note) Polyethylene wax Mw: 3000

TABLE 6

|  | Ceramic powders (average particle size) | | Amount of binder system (parts by weight) per 100 parts by weight of powder | Sintering conditions |
| --- | --- | --- | --- | --- |
| Ex. 18 | Zirconia | (22 μm) 93 wt % | 11 | 1550° C. × 6 h |
|  | Yttrium oxide | (0.4 μm) 4 wt % | | |
|  | Magnesium oxide | (0.5 μm) 3 wt % | | |
| Ex. 19 | Silicon Carbide | (0.7 μm) 98 wt % | 10 | 2100° C. × 2 h |
|  | Boron carbide | (0.8 μm) 1 wt % | | |
|  | Carbon black | (0.02 μm) 1 wt % | | |
| Ex. 20 | Amumina | (2 μm) 94 wt % | 9.5 | 1600° C. × 2 h |

TABLE 6-continued

| Ceramic powders (average particle size) | | Amount of binder system (parts by weight) per 100 parts by weight of powder | Sintering conditions |
|---|---|---|---|
| Magnesium oxide | (0.5 μm) | 3.5 wt % | |
| Silicon dioxide | (0.5 μm) | 2.5 wt % | |

As is clear from the foregoing description, the moldability of molding compounds and the molde retention of molded parts can be greatly improved by using the binder system of the present invention and this contributes to a marked improvement in the productivity of molded parts by the injection molding of metal powders, ceramic powders or cermet powders.

What is claimed is:

1. An injection moldable binder system for a sinterable powder that comprises:
   (a) 3-80 wt % of an olefinic polymer and/or copolymer with a molecular weight in excess of 2000 that has at least one epoxy group in the molecule; and
   (b) 20-80 wt % of an organic compound with a molecular weight of not more than 2000.

2. An injection moldable binder system for a sinterable powder that comprises:
   (a) 3-80 wt % of an olefinic polymer and/or copolymer with a molecular weight in excess of 2000 that has at least one epoxy group in the molecule; and
   (b) up to 70 wt % of a polymer and/or copolymer other than component (a) that has a molecular weight in excess of 2000; and
   (c) 20-80 wt % of an organic compound with a molecular weight of not more than 2000.

3. The binder system according to claim 1 or 2 wherein said olefinic polymer or copolymer (a) has a molecular weight of 50000 to 500000.

4. A binder system for use in injection molding of a sinterable powder comprising:
   (a) 3-80 wt % of an olefinic polymer and/or copolymer with a molecular weight in excess of 2000 that has at least one epoxy group in the molecule; and
   (b) up to 70 wt % of a polymer and/or copolymer other than component (a) that has a molecular weight in excess off 2000; and
   (c) 20-80 wt % of an organic compound with a molecular weight of not more than 2000, wherein said component (b) is a homopolymer and/or a copolymer that are prepared by (co)polymerizing one or more monomers selected from the group consisting of acrylate esters, methacrylate esters and styrene.

5. A compound for the injection molding of a sinterable powder which comprises a binder system for use in injection molding of a sinterable powder including:
   (a) 3-80 wt % of an olefinic polymer and/or copolymer with a molecular weight in excess of 2000 that has at least one epoxy group in the molecule; and
   (b) 20-80 wt % of an organic compound with a molecular weight of not more than 2000 and 1) a metal powder, 2) a ceramic powder or 3) a cermet powder.

6. The compound according to claim 5 wherein said metal powder, ceramic powder or cermet powder has an average particle size of 0.01-1000 μm.

7. A process for preparing a sintered material comprising the steps of;
   injection molding the compound as recited in claim 5,
   removing at least a part of the binder from the molded body, and
   sintering the debound body.

8. A sintered body being prepared by the process as recited in claim 7.

9. A process for preparing a sintered material comprising the steps of:
   injection molding the compound as recited in claim 6,
   removing at least a part of the binder from the molded body, and sintering the debound body.

10. A sintered body being prepared by the process as recited in claim 9.

11. An injection moldable binder system for a sinterable powder that comprises:
   (a) 3-80 wt % of an olefinic polymer and/or copolymer with a molecular weight in excess of 2000 that has at least one epoxy group in the molecule; and
   (b) 10-60 wt % of a polymer and/or copolymer other than component (a) that has a molecular weight in excess of 2000; and
   (c) 20-80 wt % of an organic compound with a molecular weight of not more than 2000.

12. An injection moldable compound of a sinterable powder comprising a binder system which includes at least:
   (a) 3-80 wt % of an olefinic polymer and/or copolymer with a molecular weight in excess of 2000 that has at least one epoxy group in the molecule; and
   (b) up to 70 wt % of a polymer and/or copolymer other than component (a) that has a molecular weight in excess of 2000; and
   (c) 20-80 wt % of an organic compound with a molecular weight of not more than 2000 and 1) a metal powder, 2) a ceramic power or 3) a cermet powder.

* * * * *

UNITED STATES PATENT AND TRADEMARK OFFICE
CERTIFICATE OF CORRECTION

PATENT NO. : 5,380,179
DATED : January 10, 1995
INVENTOR(S) : Kimihiro Nishimura and Kenji Yoshino It is certified that error appears in the above-indentified patent and that said Letters Patent is hereby corrected as shown below:

```
In Column 23, line 47, please change "off" to --of--; and
     line 49, please start a new paragraph at "wherein".

In Column 24, line 13, please start a new paragraph at "1) a";
     line 54, please start a new paragraph at "1) a"; and
     line 55, please change "power" to --powder--.
```

Signed and Sealed this

Twenty-sixth Day of September, 1995

Attest:

BRUCE LEHMAN

*Attesting Officer*       *Commissioner of Patents and Trademarks*